US009359900B2

(12) United States Patent
Chengappa et al.

(10) Patent No.: US 9,359,900 B2
(45) Date of Patent: Jun. 7, 2016

(54) EXHAUST DIFFUSER

(71) Applicant: General Electric Company, Schenectady, NY (US)

(72) Inventors: Manjunath Bangalore Chengappa, Bangalore (IN); Moorthi Subramaniyan, Bangalore (IN); Vignesh Radhakrishnan, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 828 days.

(21) Appl. No.: 13/646,003

(22) Filed: Oct. 5, 2012

(65) Prior Publication Data

US 2014/0096500 A1 Apr. 10, 2014

(51) Int. Cl.

| | |
|---|---|
| ***F02C 7/00*** | (2006.01) |
| ***F01N 13/00*** | (2010.01) |
| ***F02C 3/04*** | (2006.01) |
| ***F01D 5/14*** | (2006.01) |
| ***F01D 25/30*** | (2006.01) |

(52) U.S. Cl.

CPC ................ *F01D 5/145* (2013.01); *F01D 25/30* (2013.01); *F05D 2240/127* (2013.01)

(58) Field of Classification Search

CPC ......... F01D 5/145; F01D 25/30; F01D 9/041; F02K 1/386

USPC ................. 415/211.2, 914, 208.1, 208.2, 191

See application file for complete search history.

(56) References Cited

U.S. PATENT DOCUMENTS

| | | | | |
|---|---|---|---|---|
| 3,012,709 | A * | 12/1961 | Schnell | 416/236 R |
| 3,193,185 | A | 7/1965 | Erwin et al. | |
| 4,128,363 | A * | 12/1978 | Fujikake et al. | 416/236 A |
| 5,851,105 | A | 12/1998 | Fric et al. | |
| 6,792,758 | B2 | 9/2004 | Dowman | |
| 6,866,479 | B2 | 3/2005 | Ishizaka et al. | |
| 7,114,917 | B2 | 10/2006 | Legg | |
| 7,410,343 | B2 | 8/2008 | Wakazono et al. | |
| 2011/0232291 | A1 | 9/2011 | Luedke et al. | |

FOREIGN PATENT DOCUMENTS

| | | | |
|---|---|---|---|
| DE | 1428110 | A1 | 2/1969 |
| DE | 3609541 | A1 | 9/1987 |
| EP | 0976928 | A2 | 2/2000 |
| WO | 2005100752 | A1 | 10/2005 |

OTHER PUBLICATIONS

EP Search Report and Written Opinion dated Dec. 12, 2013, issued in connection with corresponding EP Patent Application No. 13187414.1.

* cited by examiner

*Primary Examiner* — Dwayne J White
*Assistant Examiner* — Julian Getachew
(74) *Attorney, Agent, or Firm* — Dority & Manning, PA

(57) ABSTRACT

An exhaust diffuser includes an outer shroud and an inner shroud radially separated from the outer shroud so as to define a fluid passage between the outer shroud and the inner shroud. A strut extends between the outer shroud and the inner shroud. The strut generally includes an outer surface, a leading edge, a trailing edge, a first side and a second side. At least one turbulator may be positioned along a radial span of the strut. The at least one turbulator extends generally outwardly from the strut outer surface. The turbulator extends across the leading edge of the strut from the first side to the second side of the strut.

18 Claims, 5 Drawing Sheets

*FIG. –1–*

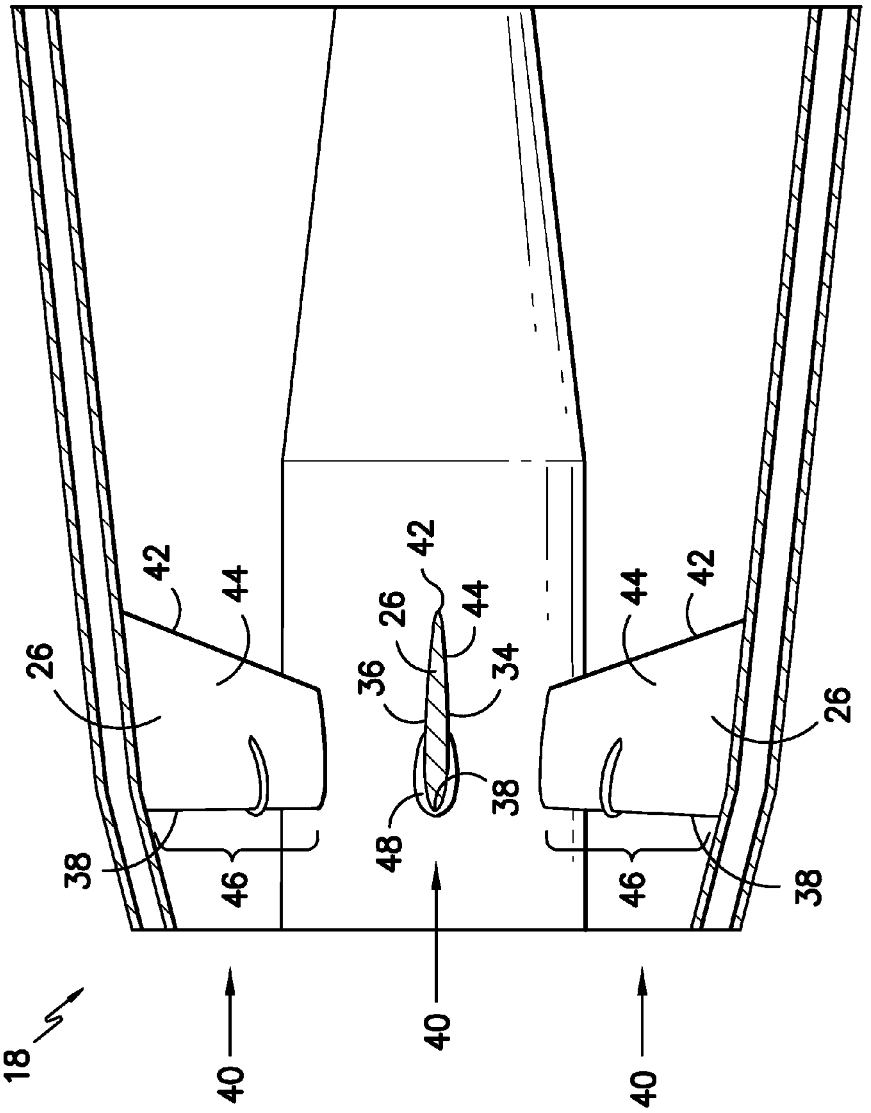
FIG. –3–

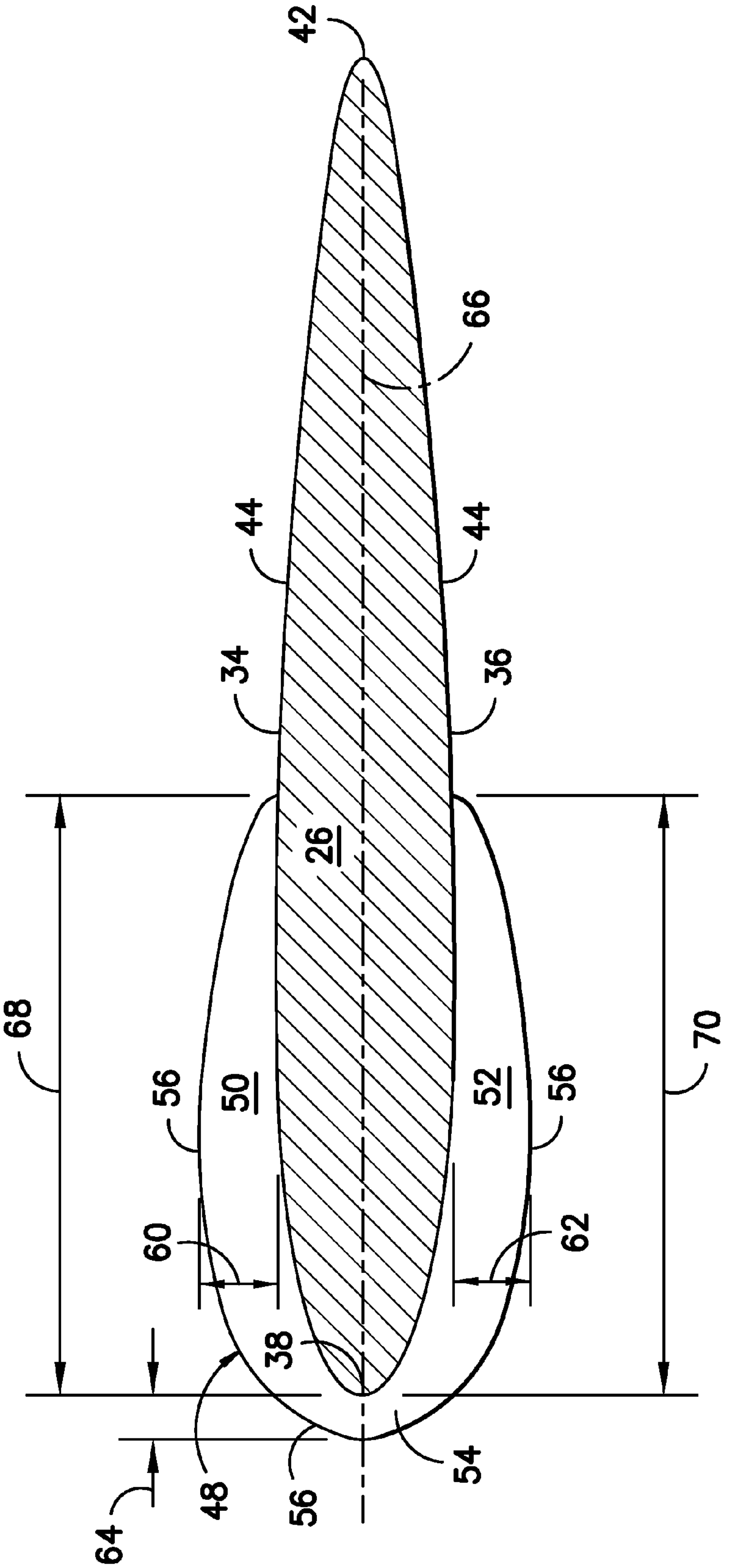
*FIG.* −4−

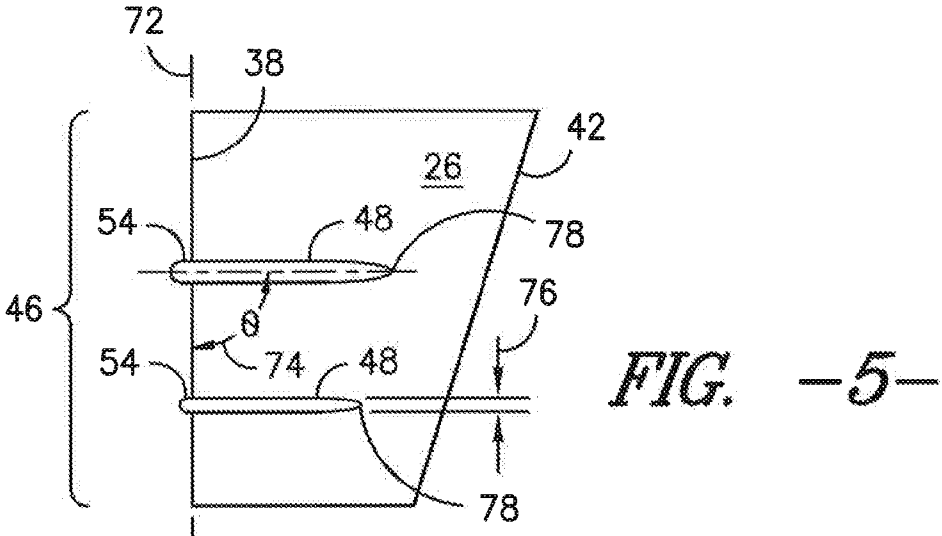
FIG. –5–
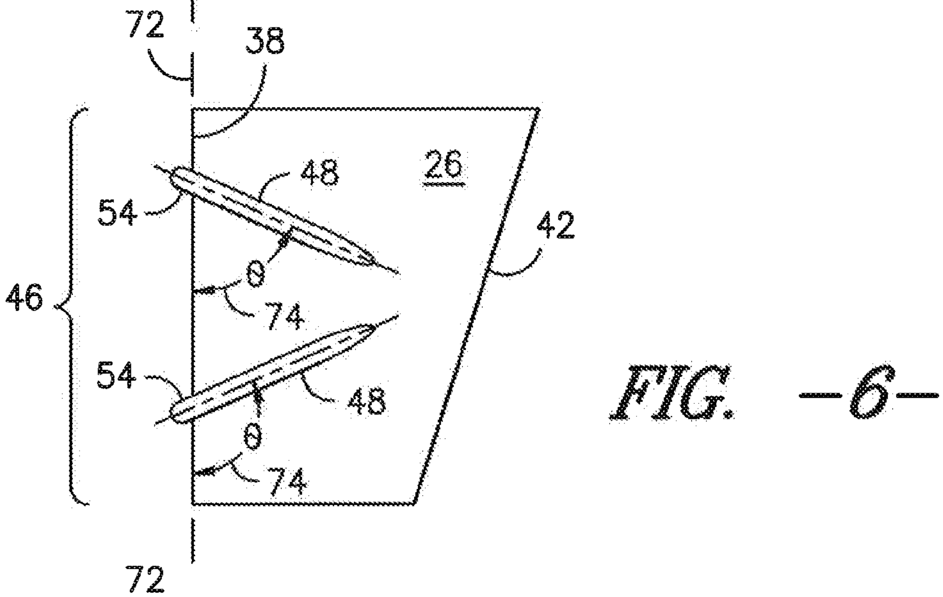
FIG. –6–
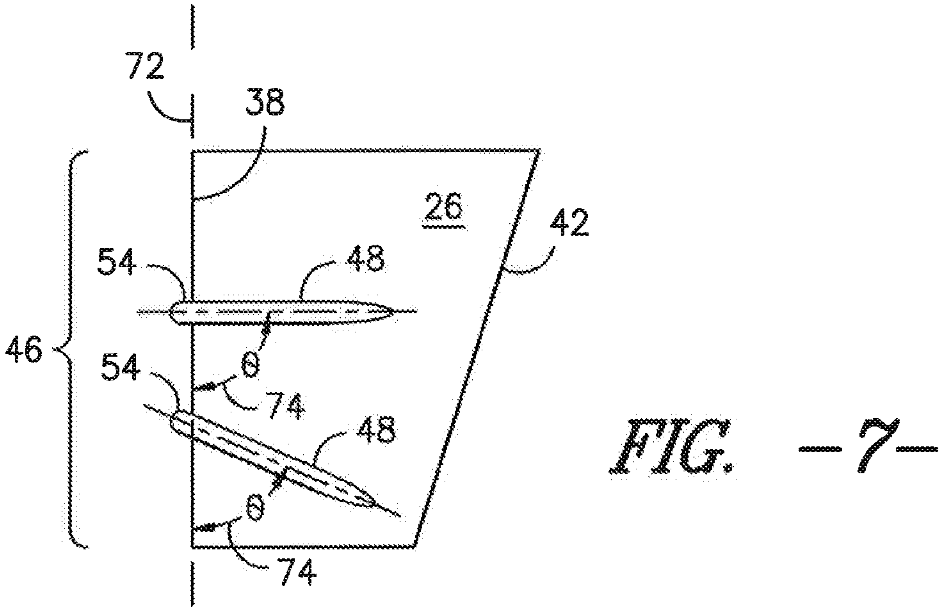
FIG. –7–

EXHAUST DIFFUSER

FIELD OF THE INVENTION

The present invention generally involves an exhaust diffuser for a gas turbine. More specifically, the present invention describes an apparatus that reduces flow separation within the exhaust diffuser to improve the efficiency of the gas turbine.

BACKGROUND OF THE INVENTION

Gas turbines are widely used in industrial and commercial operations. A typical gas turbine includes a compressor section at the front, one or more combustors around the middle, and a turbine section at the rear. The compressor section includes multiple stages of rotating blades and stationary vanes. Ambient air enters the compressor section, and the rotating blades and stationary vanes progressively impart kinetic energy to the working fluid (air) to bring it to a highly energized state. The working fluid exits the compressor section and flows to the combustors where it mixes with fuel and ignites to generate combustion gases having a high temperature and pressure. The combustion gases exit the combustors and flow to the turbine section where they expand to produce work.

An exhaust diffuser downstream of the turbine section converts the kinetic energy of the flow exiting the last stage of the turbine section into potential energy in the form of increased static pressure. This is accomplished by conducting the flow through a duct of increasing area, during which the generation of total pressure loss is to be minimized. The exhaust diffuser typically includes one or more aerodynamic airfoils which surround structural struts that may support a rotor bearing.

Exhaust gases from the turbine section enter the exhaust diffuser with a wide range of inlet swirl conditions across the load range of the gas turbine section. The varying swirl conditions may cause the exhaust gases to intercept and flow over the struts at varying incidence angles, resulting in significant aerodynamic losses such as pressure loss due to flow separation as the exhaust gases flow across the struts. In addition, high swirl at the inlet of the diffuser has the potential for causing mechanical excitation within the diffuser due to vortex shedding from the strut. Therefore, it is desirable to be able to reduce the flow separation across the diffuser struts to enhance the aerodynamic performance of the gas turbine.

BRIEF DESCRIPTION OF THE INVENTION

Aspects and advantages of the invention are set forth below in the following description, or may be obvious from the description, or may be learned through practice of the invention.

One embodiment of the present invention is an exhaust diffuser that generally includes an outer shroud and an inner shroud radially separated from the outer shroud so as to define a fluid passage between the outer shroud and the inner shroud. A strut extends between the outer shroud and the inner shroud. The strut generally includes an outer surface, a leading edge, a trailing edge, a first side and a second side. At least one turbulator may be positioned along a radial span of the strut. The at least one turbulator extends generally outwardly from the strut outer surface. The turbulator extends across the leading edge of the strut from the first side to the second side of the strut.

Another embodiment of the present invention is an exhaust diffuser having an outer shroud, an inner shroud radially separated from the outer shroud so as to at least partially define a fluid passage between the outer shroud and the inner shroud. A strut extends between the outer shroud and the inner shroud. The strut may include an outer surface, a leading edge, a trailing edge, a first side and a second side. At least one turbulator positioned along a radial span of the strut extends generally outwardly from the strut outer surface. The turbulator generally includes a first side portion disposed along the first side of the strut, a second side portion disposed along the second side of the strut, and a leading edge portion disposed along the leading edge of the strut. The first side portion, the second side portion and the leading edge portion of the turbulator are continuous.

The present invention also includes a gas turbine having a compressor section, a combustor downstream from the compressor section, a turbine section downstream from the combustor, and an exhaust diffuser downstream from the turbine section. The exhaust diffuser generally includes an inner shroud, an outer shroud at least partially surrounding the inner shroud, and a plurality of struts that extend between the inner and the outer shrouds. Each of the plurality of struts may include an outer surface, a leading edge, a trailing edge, a first side and a second side. At least one strut of the plurality of struts may include at least one turbulator positioned along a radial span of the at least one strut. The at least one turbulator extends generally outwardly from the outer surface and extends across the leading edge from the first side to the second side of the at least one strut.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 3 illustrates a cross-section of the exhaust diffuser shown in FIG. 2 taken along line 3-3;

FIG. 4 illustrates a simplified cross-section of a strut and a turbulator according to one embodiment of the present disclosure;

FIG. 5 illustrates a side view of a strut as shown in FIG. 3 having one or more turbulators according to at least one embodiment of the present disclosure;

FIG. 6 illustrates a side view of a strut as shown in FIG. 3 having one or more turbulators according to at least one embodiment of the present disclosure; and FIG. 7 illustrates a side view of a strut as shown in FIG. 3 having one or more turbulators according to at least one embodiment of the present disclosure.

DETAILED DESCRIPTION OF THE INVENTION

Figure 1:
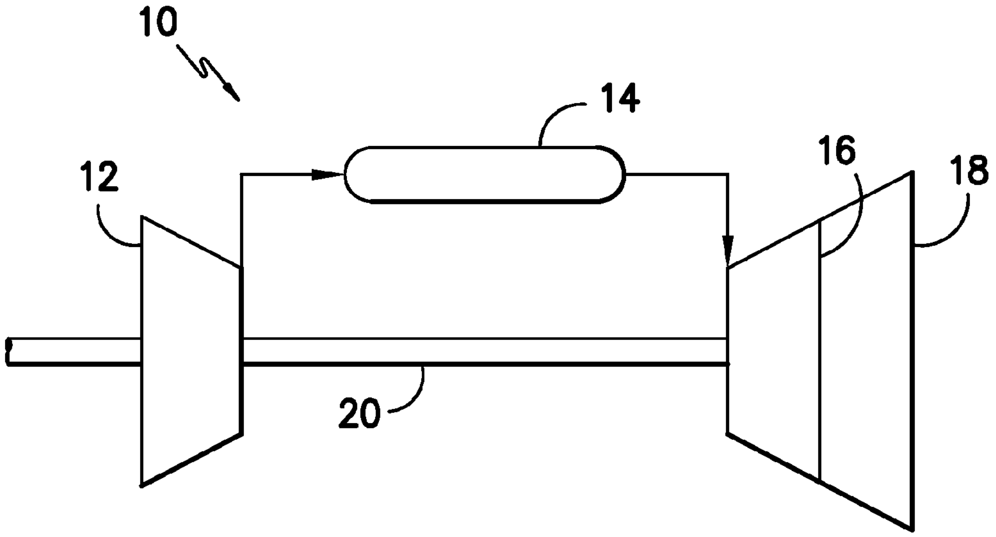
FIG. 1 illustrates a schematic of a gas turbine according to one embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention provide means for reducing aerodynamic losses across diffuser struts, and inner and outer shroud surfaces due to flow separation of combustion exhaust gases flowing from a turbine section of a gas turbine and into the exhaust diffuser at high tangential flow angles, particularly at part load operation of the gas turbine. The high tangential angles or “swirl” and the resulting flow separation may reduce static pressure recovery, thereby reducing overall gas turbine efficiency. The present disclosure provides for one or more turbulators positioned at one or more locations along a radial span of the diffusor struts. The turbulators may generally have an aerodynamic profile that reduces the flow separation, thereby improving overall gas turbine performance in the presence of high swirl conditions. Although exemplary embodiments of the present invention will be described generally in the context of an exhaust diffuser incorporated into a gas turbine for purposes of illustration, one of ordinary skill in the art will readily appreciate that embodiments of the present invention may be applied to any exhaust diffuser and are not limited to a gas turbine exhaust diffuser unless specifically recited in the claims.

FIG. 1 shows a simplified schematic of a gas turbine. As shown, a gas turbine 10 may generally include a compressor section 12, one or more combustors 14 downstream from the compressor section 12, a turbine section 16 downstream from the one or more combustors 14 and an exhaust diffuser 18 downstream from the turbine section 16. One or more shafts 20 may extend generally axially through the gas turbine 10. The one or more shafts 20 may couple the turbine section 16 to the compressor section 12.

Figure 2:
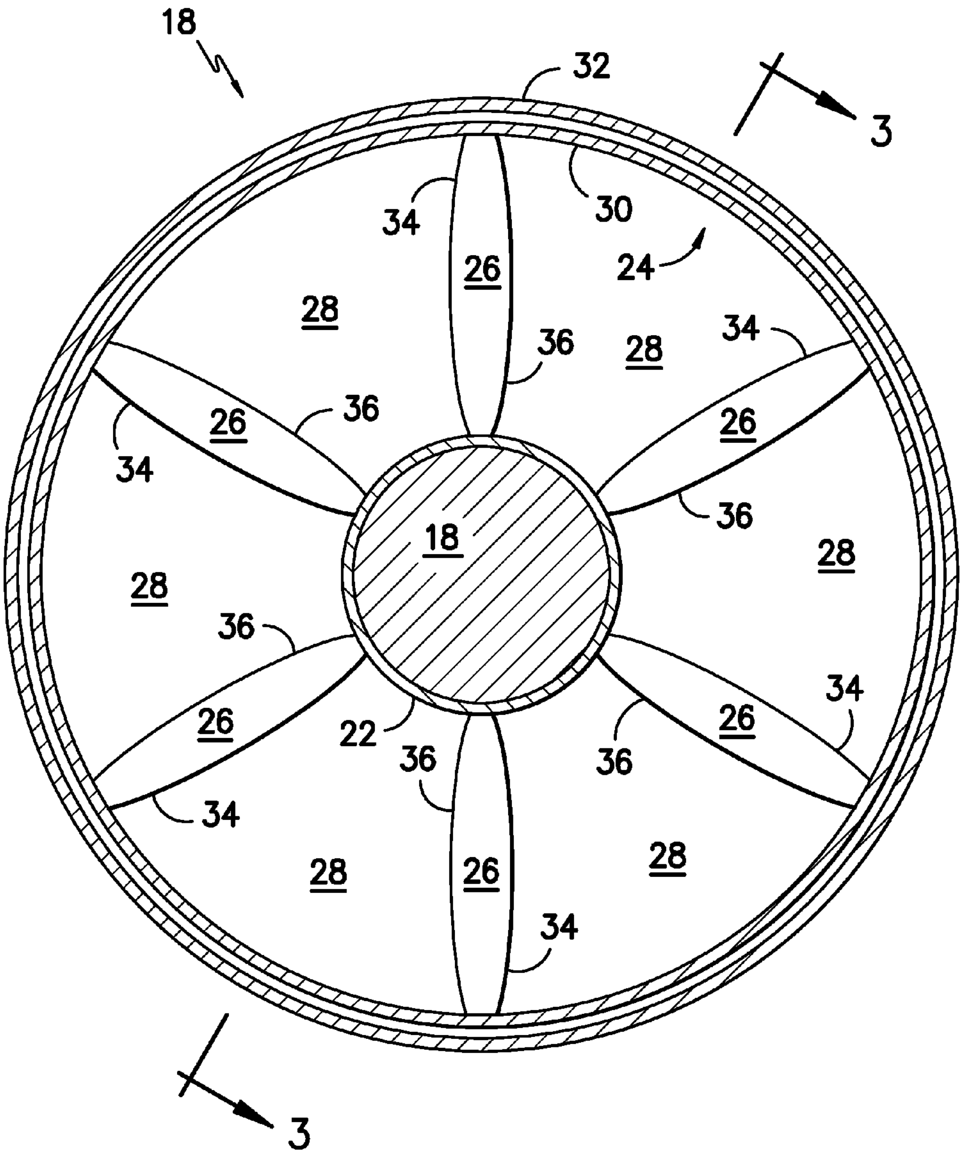
FIG. 2 illustrates a simplified cross-section of an exhaust diffuser according to one embodiment of the present disclosure.

FIG. 2 shows a simplified cross-section of the exhaust diffuser 18 according to one embodiment of the present disclosure. As shown, the exhaust diffuser 18 generally includes an inner shroud 22, an outer shroud 24, and one or more struts 26. The inner shroud 22 is generally an arcuate surface or casing that surrounds rotating components. For example, the shroud 22 may surround or encase the shaft 20 of the gas turbine 10 shown in FIG. 1. As shown in FIG. 2, the outer shroud 24 is radially separated from the inner shroud 22 and generally surrounds the inner shroud 22 to define a fluid passage 28 between the inner shroud 22 and the outer shroud 24. The outer shroud 24 may be a double walled construction, with an inner wall 30 separated by an air space from an outer wall 32. The present disclosure is not limited to any particular size, shape, material, or other physical characteristics of the inner shroud 22, the outer shroud 24 and/or the outer shroud walls 30, 32, except as recited in the claims.

The struts 26 generally extend between the inner shroud 22 and the outer shroud 24 so as to orient the inner shroud 22 with respect to the outer shroud 24. In the context of the present invention, the term “strut” includes any structure or supporting member that extends between the inner shroud 22 and the outer shroud 24. The struts 26 generally include a first side 34 and a second side 36 that combine to form an aerodynamic structure.

FIG. 3 shows a cross-section of the exhaust diffuser 18 shown in FIG. 2 taken along line 3-3. As shown in FIG. 3, each strut 26 generally includes a leading edge 38 facing the direction of a flow of combustion gases 40 and a trailing edge 42 downstream from the leading edge 38. A centerline 66 such as a chord line and/or a camber line extends generally through the center of each strut from the leading edge 38 to the trailing edge 42. Each of the struts 26 includes an outer surface 44 that extends around each strut 26. A radial span 46 is generally defined as a radial distance along the outer surface 44 of the strut between the inner shroud 22 and the outer shroud 24. At least one of the struts 26 may include at least one turbulator 48 disposed along the radial span 46 of the strut 26. The turbulator 48 extends outwardly from the outer surface 44 of the strut 26. In particular embodiments, as shown, the turbulator 48 may extend across the leading edge of the strut 26 from the first side to the second side of the strut 26.

FIG. 4 shows a cross sectional top view of one of the struts 26 and the turbulator 48. As shown, the turbulator 48 may generally have an aerodynamic profile. The turbulator 48 may include a first side portion 50 that extends outwardly from the strut 26 outer surface 44 and along the first side 34 of the strut 26. The first side portion 50 may extend at least partially between the leading edge 38 and the trailing edge 42 of the strut 26. The turbulator 48 may further include a second side portion 52. The second side portion may extend outwardly from the strut 26 outer surface 44 along the second side 36 of the strut 26 at least partially between the leading edge 38 and the trailing edge 42 of the strut 26. The turbulator 48 may further include a leading edge portion 54. The leading edge portion 54 of the turbulator 48 generally extends outwardly from the outer surface 44 of the strut 26 at least partially around the leading edge 38 of the strut 26. The turbulator 48 generally defines a peripheral edge 56 that extends around the turbulator 48.

“Width” of the turbulator 48 is defined as the distance from the outer surface 44 of the strut 26 to the peripheral edge 56 of the turbulator 48. The width of the turbulator 48 may vary between the first side portion 50, the second side portion 52 and the leading edge portion 54 of the turbulator 48. For example, the first side portion 50 may extend a first width 60 and the second side portion 52 may extend a second width 62 from the strut 26 outer surface 44. In particular embodiments, the first width 60 and/or the second width 62 may fall within a range of about 0.0 inches to about 3.5 inches or, more specifically from about 1.5 inches to about 3.0 inches or, more specifically from about 2.0 inches to about 3.0 inches or, more specifically the first width 60 and/or the second width 62 may be about 2.3 inches or about 2.5 inches or about 2.8 inches. In particular embodiments the first width 60 and the second width 62 may be generally symmetrical. In the alternative, the first width 60 and the second width 62 may be asymmetrical.

The leading edge portion 54 may extend a third width 64 from the outer surface 44 of the strut 26. For example, but not limiting of, the third width 64 may fall within a range of about 0.0 inches to about 3.0 inches or, more specifically from about 0.5 inches to about 2.5 inches or, more specifically from about 1.0 inch to about 2.5 inches or, more specifically from about 1.3 inches to about 2.3 inches or, more specifically the third width 64 may be about 1.5 inches or about 1.63 inches or about 2.0 inches. In further embodiments, the third width 64 may be greater than 3.0 inches.

As shown in FIG. 4, the turbulator 48 may extend a distance measured along the centerline 66 of the strut 26 equal to or less than the total distance between the leading edge and the trailing edge 42 of the strut 26. In particular embodiments, for example, the turbulator 48 first side portion 50 may extend at least partially between the leading edge and the trailing edge 42 of the strut 26 a first distance 68 as measured along the centerline 66 of the strut 26. For example, in particular embodiments, the first side portion 50 first distance 68 may fall within a range of about 10 inches to about 40 inches or, more specifically from about 15 inches to about 35 inches or, more specifically from about 15 inches to about 30 inches or, more specifically the first side portion 50 first distance 68 may be about 18 inches or about 20 inches or about 30 inches. In the alternative, the first side portion 50 may extend from the leading edge to the trailing edge 42 of the strut 26.

The turbulator 48 second side portion 52 may extend at least partially between the leading edge and the trailing edge 42 of the strut 26 a second distance 70 as measured along the centerline 66 of the strut 26. For example, in particular embodiments, the second side portion 52 second distance 70 may fall within a range of about 10 inches to about 40 inches or, more specifically from about 15 inches to about 35 inches or, more specifically from about 15 inches to about 30 inches or, more specifically the second side portion 52 second distance 70 may be about 18 inches or about 20 inches or about 30 inches. In the alternative, the second side portion 52 may extend from the leading edge to the trailing edge 42 of the strut 26. The first side portion 50 first distance 68 and the second side portion 52 second distance 70 may be symmetrical. In the alternative, the first side portion 50 first axial distance and the second side portion 52 second axial may be asymmetrical.

FIGS. 5 through 7 provide side views of one of the struts 26 according to various embodiments of the present disclosure. As shown, more than one of the turbulator 48 may be disposed along the radial span 46 of the struts 26. Although a single strut 26 is shown, it should be obvious to one of ordinary skill in the art that each or some of the struts 26 of the diffuser 18 may comprise of one or more of the turbulators 48. As shown in FIGS. 5 through 7 the leading edge of each strut 26 may generally define a radial reference line 72 that extends the radial span 46 of each strut 26. In particular embodiments, as shown in FIGS. 5 through 7, the turbulator 48 may extend at least partially between the leading edge and the trailing edge 42 of the strut 26 at angle 74 that is substantially perpendicular to the strut 26 leading edge radial reference line 72. In the alternative, as shown in FIGS. 6 and 7, the turbulator 48 may extend at least partially between the leading edge and the trailing edge 42 of the strut 26 at angle 74 that is not generally perpendicular to the strut 26 leading edge radial reference line 72. For example, as shown in FIGS. 6 and 7, the turbulator 48 may extend at angle 74 that is generally acute or obtuse to the leading edge of the strut 26. The turbulator 48 first side portion 50 and the turbulator 48 second side portion 52 may extend along the first side and the second side of the strut 26 respectfully, at the same angle 74. In the alternative, the turbulator 48 first side portion 50 may extend along the strut 26 first side at a first angle 74 and the turbulator 48 second side portion 52 may extend along the strut 26 second side at a second angle 74 where the first and the second angles 74 are asymmetrical. In particular embodiments, as shown in FIG. 6, the strut 26 may include at least two of the turbulators 48 at different angle 74. In the alternative, as shown in FIG. 7, the strut 26 may include two turbulators 48 where one turbulator 48 is substantially perpendicular to the leading edge of the strut 26 and the other turbulator 48 is not substantially perpendicular to the leading edge of the strut 26.

As shown in FIG. 5, the turbulator 48 has a radial thickness 76. The turbulator 48 radial thickness 76 may be constant or may vary from the first side portion 50, to the leading edge portion 54 and/or to the second side portion 52 of the turbulator 48. As shown, the radial thickness 76 may gradually decrease adjacent to a trailing edge 78 of the turbulator 48. In general, the radial thickness 76 may be less than 0.5 inches or may be more than 3.0 inches. In particular embodiments, the radial thickness 76 may fall within a range of about 0.5 inches to about 2.5 inches or, more specifically the radial thickness 76 may be 1.0 inches or about 1.5 inches or about 2.0 inches.

As shown in FIGS. 5 through 7, the turbulator 48 may be disposed at any point along the radial span 46 of the leading edge of the strut 26. For example, in particular embodiments, the leading edge portion 54 of the turbulator 48 may be disposed on the leading edge of the strut 26 at a position that is within a range of about 10 percent to about 90 percent of the total radial span 46 or, more specifically between about 20 percent and about 80 percent of the total radial span 46 or, more specifically between about 30 percent and about 80 percent of the total radial span 46 or, more specifically between about 35 percent and about 80 percent of the total radial span 46 or, more specifically between about 35 percent and about 45 percent of the total radial span 46 or, more specifically between about 55 percent and about 65 percent of the total radial span 46 or, more specifically between about 70 percent and about 80 percent of the total radial span 46 or, more specifically the leading edge portion 54 of the turbulator 48 may be disposed on the leading edge of the strut 26 at about 40 percent of the total radial span 46 or at about 60 percent of the total radial span 46 or at about 75 percent of the total radial span 46.

In one embodiment, the turbulator 48 leading edge third width 64 may be about 1.6 inches, the first side portion 50 first width 60 and the second side portion 52 second width 62 may be about 2.5 inches, the first side portion 50 first distance 68 and second side portion 52 second distance 70 may be about 20.0 inches, the radial thickness may be about 1.0 inch, the angle 74 of the turbulator 48 may be at about 105 degrees relative to the leading edge of the strut 26, and the turbulator 48 may be disposed along the leading edge of the strut 26 at about 40 percent of the radial span 46.

In an alternate embodiment, the turbulator 48 leading edge third width 64 may be about 1.5 inches, the first side portion 50 first width 60 and the second side portion 52 second width 62 may be about 2.3 inches, the first side portion 50 first distance 68 and second side portion 52 second distance 70 may be about 30.0 inches, the radial thickness may be about 1.5 inches, the angle 74 of the turbulator 48 may be at about 120 degrees relative to the leading edge of the strut 26, and the turbulator 48 may be disposed along the leading edge of the strut 26 at about 60 percent of the radial span 46.

In a further embodiment, the turbulator 48 leading edge third width 64 may be about 2.0 inches, the first side portion 50 first width 60 and the second side portion 52 second width 62 may be about 2.8 inches, the first side portion 50 first distance 68 and second side portion 52 second distance 70 may be about 18 inches, the radial thickness may be about 2.0 inches, the angle 74 of the turbulator 48 may be at about 60 degrees relative to the leading edge of the strut 26, and the turbulator 48 may be disposed along the leading edge of the strut 26 at about 60 percent of the radial span 46.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An exhaust diffuser, comprising;

a. an outer shroud, wherein the outer shroud comprises a double wall construction including an inner wall radially spaced from an outer wall so as to define an airspace therebetween;

b. an inner shroud radially separated from the outer shroud to define a fluid passage between the outer shroud and the inner shroud;

c. a strut extending between the outer shroud and the inner shroud, the strut having an outer surface, a leading edge, a trailing edge, a first side and a second side, wherein the strut is stationary between the outer shroud and the inner shroud; and d. at least one turbulator positioned along a radial span of the strut and that extends outwardly from the strut outer surface, the at least one turbulator extending across the leading edge of the strut from the first side to the second side of the strut;

e. wherein the at least one turbulator reduces aerodynamic losses across the strut, the inner shroud and the outer shroud resulting from flow separation of combustion exhaust gases flowing from a turbine section of a gas turbine and into the exhaust diffuser at tangential flow angles.

2. The exhaust diffuser as in claim 1, wherein the at least one turbulator extends outwardly from the strut first side at a first width, from the strut second side at a second width, and from the strut leading edge at a third width.

3. The exhaust diffuser as in claim 2, wherein the first width and the second width are asymmetrical.

4. The exhaust diffuser as in claim 2, wherein the third width is less than at least one of the first width or the second width.

5. The exhaust diffuser as in claim 1, wherein the at least one turbulator extends from the leading edge towards the trailing edge of the strut at a first distance across the first side of the strut and at a second distance across the second side of the strut.

6. The exhaust diffuser as in claim 1, wherein the at least one turbulator extends at least partially between the leading edge and the trailing edge of the strut at an angle that is perpendicular to the leading edge of the strut.

7. The exhaust diffuser as in claim 1, wherein the at least one turbulator extends at least partially between the leading edge and the trailing edge of the strut at an angle that is acute or obtuse to the leading edge of the strut.

8. An exhaust diffuser, comprising:

a. an outer shroud, wherein the outer shroud comprises a double wall construction including an inner wall radially spaced from an outer wall so as to define an airspace therebetween;

b. an inner shroud radially separated from the outer shroud to define a fluid passage between the outer shroud and the inner shroud;

c. a strut extending between the outer shroud and the inner shroud, the strut having an outer surface, a leading edge, a trailing edge, a first side and a second side, wherein the strut is stationary between the outer shroud and the inner shroud; and d. at least one turbulator positioned along a radial span of the strut and that extends outwardly from the strut outer surface, the at least one turbulator having a first side portion disposed along the first side of the strut, a second side portion disposed along the second side of the strut, and a leading edge portion disposed along the leading edge of the strut, wherein the first side portion, the second side portion and the leading edge portion are continuous;

e. wherein the at least one turbulator reduces aerodynamic losses across the strut and within the fluid passage resulting from flow separation of combustion exhaust gases flowing from a turbine section of a gas turbine and into the exhaust diffuser at tangential flow angles.

9. The exhaust diffuser as in claim 8, wherein the at least one turbulator extends outwardly front the strut first side at a first width, from the strut second side at a second width, and from the strut leading edge at a third width.

10. The exhaust diffuser as in claim 9, wherein the first width and the second width are asymmetrical.

11. The exhaust diffuser as in claim 9, wherein the third width is less than at least one of the first width or the second width.

12. The exhaust diffuser as in claim 8, wherein the at least one turbulator extends from the leading edge towards the trailing edge of the strut at a first distance across the first side of the strut and at a second distance across the second side of the strut.

13. The exhaust diffuser as in claim 8, wherein the at least one turbulator extends at least partially between the leading edge and the trailing edge of the strut at an angle that is perpendicular to the leading edge of the strut.

14. The exhaust diffuser as in claim 8, wherein the at least one turbulator extends at least partially between the leading edge and the trailing edge of the strut at an angle that is-acute or obtuse to the leading edge of the strut.

15. A gas turbine, comprising:

a. a compressor section;

b. at least one combustor downstream from the compressor section;

c. a turbine section downstream from the at least one combustor;

d. an exhaust diffuser downstream from the turbine section, the exhaust diffuser haying an inner shroud, an outer shroud at least partially surrounding the inner shroud, and a plurality of struts that extend between the inner and the outer shrouds, wherein the outer shroud comprises a double wall construction including an inner wall radially spaced from an outer wall so as to define an airspace therebetween, each of the plurality of struts having an outer surface, a leading edge, a trailing edge, a first side and a second side, wherein each strut of the plurality of struts is stationary between the outer shroud and the inner shroud; and e. wherein at least one strut of the plurality of struts includes at least one turbulator positioned along a radial span of the at least one strut, the at least one turbulator extending outwardly from the outer surface and extending across the leading edge from the first side to the second side of the at least one strut;

f. wherein the at least one turbulator reduces aerodynamic losses across the at least one strut, the inner shroud and the outer shroud resulting from flow separation of combustion exhaust gases flowing from the turbine section into the exhaust diffuser at tangential flow angles.

16. The gas turbine as in claim 15, wherein the at least one turbulator extends at least partially between the :leading edge and the trailing edge of the at least one strut at an angle that is acute to the leading edge of the at least one strut.

17. The gas turbine as in claim 15, wherein the at least one turbulator extends at least partially between the leading edge and the trailing edge of the at least one strut at an angle that is perpendicular to the leading edge of the at least one strut.

18. The exhaust diffuser as in claim 15, wherein the at least one turbulator extends at least partially between the leading edge and the trailing edge of the at least one strut at an angle that is obtuse to the leading edge of the at least one strut.

* * * * *